(No Model.)
S. P. SPOONER.
PISTON FOR FORCE PUMPS.
No. 307,815. Patented Nov. 11, 1884.
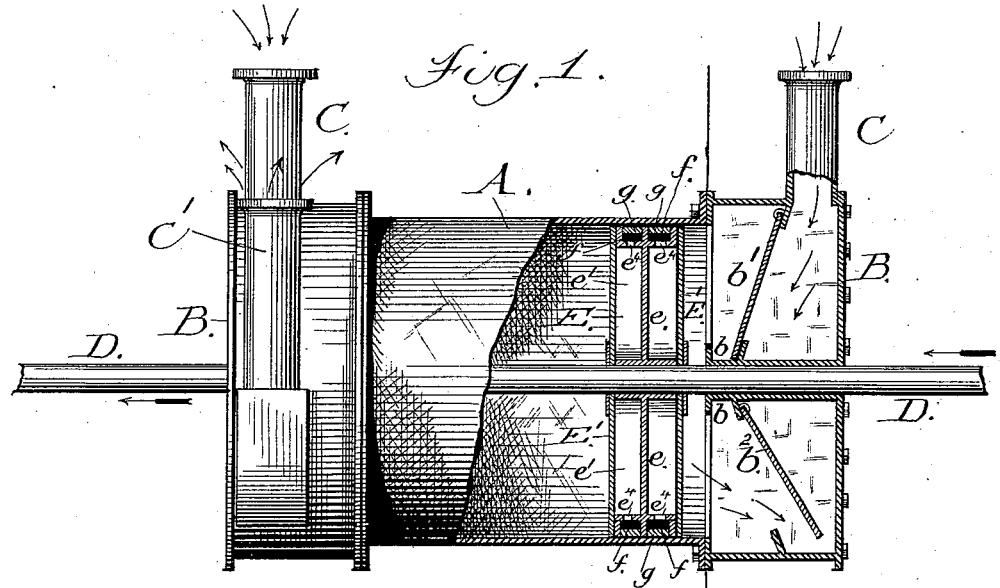
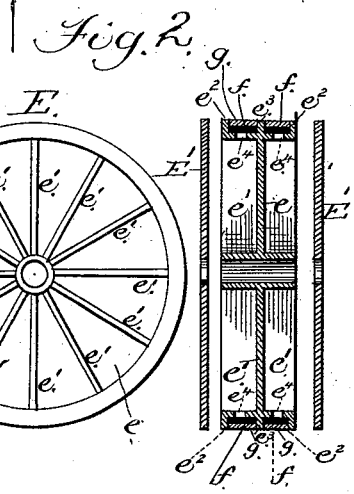
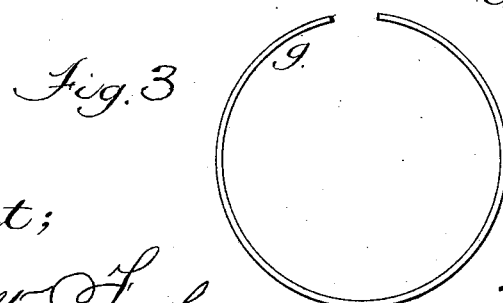
Attest:
J. Walter Fowler
H. B. Applewhaite
Inventor:
Saml. P. Spooner
per attys.
A. H. Evans & Co.

UNITED STATES PATENT OFFICE.

SAMUEL P. SPOONER, OF BUCKLIN, MISSOURI.

PISTON FOR FORCE-PUMPS.

SPECIFICATION forming part of Letters Patent No. 307,815, dated November 11, 1884.

Application filed October 19, 1883. (No model.)

*To all whom it may concern:*

Be it known that I, SAMUEL P. SPOONER, a citizen of the United States, residing at Bucklin, in the county of Linn and State of Missouri, have invented certain new and useful Improvements in Double-Acting Force-Pumps; and I do hereby declare that the following is a full, clear, and exact description of the same, reference being made to the accompanying drawings, forming a part of this specification, and in which—

Figure 1 represents a longitudinal vertical central section through my improved pump; Fig. 2, a detail view of the double piston-head. Fig. 3 is a detail view to be referred to.

This invention relates to certain new and useful improvements in the class of double-acting force-pumps; and it consists in novel features of construction and combination and arrangement of parts, all as will be hereinafter fully described, and set forth in the claims hereto annexed.

In the drawings, A represents the cylinder of a pump, provided at its ends with the circular valve-chambers B B, centrally divided by a partition, $b$, to which are connected or hinged the valves $b'$ $b^2$.

C C' represent, respectively, the induction and eduction pipes.

D represents the piston-rod passing centrally through the valve-chambers and cylinder, and having mounted centrally thereon the piston-head E, composed of a disk or ring centrally divided, so as to form a double piston-head, by a partition, $e$, and each side of said disk or ring strengthened by radiating ribs $e'$. This disk or ring is provided with outside annular flanges, $e^2$, and central outside flange, $e^3$, the circumference of said ring having perforations $e^4$ through it between said central and outer flanges, which are covered by rubber packing-rings $f$ $f$, and these rings encircled by expansible metallic cut rings $g$ $g$, all as clearly shown in Figs. 1 and 3. The perforations $e^4$ through the disk or ring are for the purpose of allowing the compressed air or water to keep the packing-rings pressed out against the inner surface of the cylinder, and thereby form a tight packing between piston-head and cylinder. On each side of the piston-head is arranged a circular rubber flange, E', substantially as shown in Figs. 1 and 3, for the purpose of sweeping the inner surface of the cylinder, and thereby keeping it free from grit or gritty substances, and thereby permitting the piston-head to work much more freely and easier in the cylinder. The rubber flanges E' should be provided with metal rings so inserted as to prevent the rubber from wearing away too fast.

Having thus fully described my invention, what I claim as new, and desire to secure by Letters Patent, is—

1. The combination, with the cylinder, of the piston-head provided with the rubber sweeping flange or flanges E', substantially as and for the purpose herein shown and described.

2. The herein-described double piston-head, composed of the disk or ring centrally divided by partition $e$, annular projecting flanges $e^2$ $e^2$, central annular flange, $e^3$, and having perforations $e^4$ through it between said flanges $e^2$ and $e^3$, packing-rings $f$ $f$, and expansible cut metallic rings $g$ $g$, substantially as and for the purpose herein shown and described.

SAMUEL P. SPOONER.

Witnesses:
THOMAS V. BRYANT,
DANIEL B. HOLMES.